(12) United States Patent
Lu et al.

(10) Patent No.: US 11,258,596 B2
(45) Date of Patent: Feb. 22, 2022

(54) SYSTEM TO GENERATE A SIGNATURE KEY AND METHOD OF OPERATING THE SAME

(71) Applicant: TAIWAN SEMICONDUCTOR MANUFACTURING COMPANY LTD., Hsinchu (TW)

(72) Inventors: Shih-Lien Linus Lu, Hsinchu (TW); Cormac Michael O'Connell, Ontario (CA)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 620 days.

(21) Appl. No.: 16/102,628

(22) Filed: Aug. 13, 2018

(65) Prior Publication Data

US 2020/0052893 A1 Feb. 13, 2020

(51) Int. Cl.
*H04L 9/00* (2006.01)
*H04L 9/08* (2006.01)
*G06F 12/02* (2006.01)
*H04L 9/32* (2006.01)

(52) U.S. Cl.
CPC ........ *H04L 9/0866* (2013.01); *G06F 12/0292* (2013.01); *H04L 9/3278* (2013.01); *H04L 2209/12* (2013.01)

(58) Field of Classification Search
CPC .. H04L 9/0866; H04L 9/3278; G06F 12/0292
USPC .......................................................... 380/44
See application file for complete search history.

(56) References Cited

U.S. PATENT DOCUMENTS

| | | | | |
|---|---|---|---|---|
| 9,083,323 | B2* | 7/2015 | Guo | H03K 5/156 |
| 10,797,891 | B2* | 10/2020 | Yao | H04L 9/3247 |
| 11,038,680 | B2* | 6/2021 | Danger | H04L 9/3278 |
| 2015/0043270 | A1* | 2/2015 | Singh | G11C 11/416 365/154 |
| 2015/0188717 | A1* | 7/2015 | Wu | G09C 1/00 380/44 |
| 2019/0305971 | A1* | 10/2019 | Li | G11C 7/12 |
| 2019/0342106 | A1* | 11/2019 | Li | H04L 9/3278 |

OTHER PUBLICATIONS

M. Alioto and A. Alvares, "Physically Unclonable Function database," [online] http://www.green-ic.org/pufdb.

* cited by examiner

*Primary Examiner* — Christopher J Brown
(74) *Attorney, Agent, or Firm* — WPAT, P.C., Intellectual Property Attorneys; Anthony King

(57) ABSTRACT

A method for utilizing a plurality of physical unclonable function (PUF) cells to generate a signature key with a desired bit length is provided. The method includes setting a state of each of the plurality of PUF cells to a uniform level; obtaining an order of change in the state of at least a portion of the plurality of PUF cells; and generating the signature key at least based on the order.

20 Claims, 8 Drawing Sheets

SYSTEM TO GENERATE A SIGNATURE KEY AND METHOD OF OPERATING THE SAME

BACKGROUND

As reliance on computer systems and the internet increases in many areas such as personal communications, shopping, banking, commerce, etc., the need for improved cyber security also increases. Many security measures may be employed, including cryptography. A physical unclonable function (PUF) is a physical object embodied in a physical structure that can be used to produce an output. The output is easy to evaluate but the output is very hard or nearly impossible to predict. A PUF can be used as a unique identification or key in secure computing and communication.

An individual PUF device must be easy to make but practically impossible to duplicate, even given the exact manufacturing process that produced it. In this respect it is the hardware analog of a one-way function. PUFs are typically implemented in integrated circuits and are typically used in applications with high security requirements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
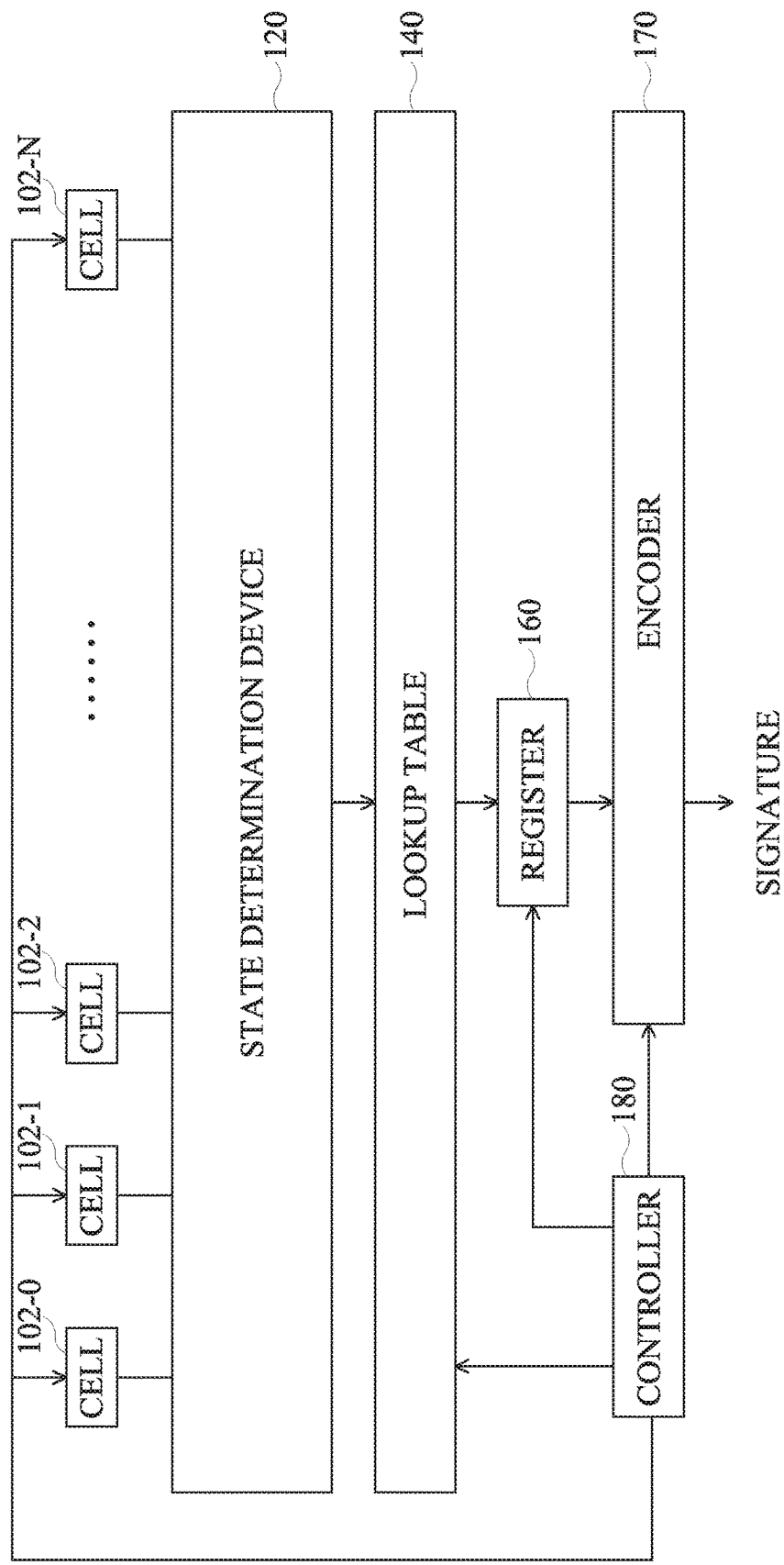
FIG. 1 is a block diagram of a system for generating a signature key, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As noted above, a physical unclonable function (PUF) is a physical object embodied in a physical structure that can be used to produce an output that is easy to evaluate but nearly impossible to predict. There are many different implementation approaches to PUF. For example, there are delay chain based PUFs, wherein the PUF translates variations (difference) into delay variances. Such PUFs employ a set of delay chains made of logic gates. Due to static variations of components, each chain will have a different delay. By sampling the delay, a signature can be produced.

Another approach is a memory-based PUF, wherein variations of devices in a bi-stable element are translated to generate either a "1" or a "0." A particular type of memory-based PUF is a static random access memory (SRAM) PUF. Such PUFs utilize small memory cell variations to produce signatures. For example, one type of SRAM PUF gets its signatures from the start-up states of cells.

Integrated circuit (IC) devices generally include electronic circuits formed on a semiconductor substrate, or "chip," formed of a semiconductor material such as silicon. The integration of large numbers of tiny components results in circuits that are orders of magnitude smaller, cheaper, and faster than those constructed of discrete electronic components. Since IC devices were first introduced, the size, speed, and capacity of IC devices have progressed enormously, driven by technical advances that allow more and more transistors on chips of the same size.

FIG. 1 is a block diagram of a system 10 for generating a signature key, in accordance with some embodiments. Referring to FIG. 1, the system 10 includes a plurality of physical unclonable function (PUF) cells 102 (for example, 102-0, 102-1, 102-2 . . . 102-N, wherein N is positive integer), a state determination device 120, a lookup table 140, a register 160, an encoder 170 and a controller 180.

Each PUF cell 102, whether on different chips or the same chip, exhibits a unique characteristic because of its unique intrinsic properties, for example, intrinsic parasitic capacitance. The characteristic is random and inherent, but deterministic. The characteristic includes, for example, retention time. The retention time refers to a period of time that elapses before a state of the PUF cell 102, which was set to an initial state, is changed. For example, in an initial state, a state of a PUF cell 102 is set at a logic HIGH level by, for example, being pre-charged. After 5 microseconds, the state is changed from a logic HIGH level to a logic LOW level. In this case, the retention time is about 5 μs. The time required for the PUF cell 102 to change its state is random but deterministic. In some embodiments, the PUF cell 102 includes memory cells, such as dynamic random-access memory (DRAM) cells, or static random-access memory (SRAM) cells. In some embodiments, the PUF cell 102 includes optical cells. In this embodiment, the characteristic includes a period of time. After the period of time, light photons are able to charge a charge-coupled device (CCD) to a desired voltage. In some embodiments, the PUF cell 102 includes piezoelectric cells. In such embodiments, the characteristic includes a period of time. After the period of time, random vibrations are sufficient to be harvested.

The state determination device 120 functions to sample a state of each of the plurality of PUF cells 102 by using a sampling rate, and functions to determine which PUF cell 102's state is changed. In further detail, when a state of at least a portion of the plurality of PUF cells 102 (in the following text at least the portion of the plurality of PUF cells 102 are also called the changed PUF cells 102, when appropriate) is changed, the state determination device 120 samples the state of the portion of the plurality of PUF cells to obtain a plurality of state changing information, thereby obtaining an order of change in the state of at least the portion of the plurality of PUF cells 102s, wherein the plurality of state changing information corresponds to the portion of the plurality of PUF cells 102 and the plurality of state changing information individually corresponds to one of the portion of the plurality of PUF cells 102s. In some embodiments, the sampling rate corresponds to a sampling period. The sampling period is shorter than a minimum time difference between two consecutive changes of the state of two of the plurality of PUF cells 102. For example, a time difference between a point at which the PUF cell 102-0 flips and a point at which the PUF cell 102-1 flips is about 5 μs. Another time difference between a point at which the PUF cell 102-1 flips and a point at which the PUF cell 102-2 flips is about 10 μs, greater than 5 μs. Moreover, compared to other time differences, 5 μs is a minimum time difference. In the current example, the sampling period is shorter than 5 μs. In some embodiments, before a first change in a state for the plurality of PUF cells 102, the state of each of the plurality of PUF cells 102 is sampled, thereby increasing the efficiency in generating a signature key, as will be described in detail below. In some embodiments, the state determination device 120 is implemented with logic gates, a portion of a processor, other suitable hardware devices, other suitable firmware devices, other suitable software devices, or the combination thereof.

The lookup table 140 functions to store an address of each of the plurality of PUF cells 102, and functions to individually convert the plurality of state changing information received from the state determination device 120 into one of the plurality of addresses. In some embodiments, the controller 180 determines whether the lookup table 140 successfully receives the plurality of state changing information from the state determination device 120. When the controller 180 determines that the lookup table 140 successfully receives the plurality of state changing information, the controller 180 controls the lookup table 140, such that the lookup table 140 provides the address according to the state changing information. For example, the PUF cell 102-0 is a first changed PUF cell, and the PUF cell 102-2 is a second changed PUF cell following the first changed PUF cell. In this case, the lookup table 140 first provides the address of the PUF cell 102-0 to the register 160. The lookup table 140 next provides the address of the PUF cell 102-2 to the register 160.

An address includes a plurality of bits. A structure of the address is associated with that of the signature key. In further detail, for a preferred signature key, it is preferred to construct a structure of such signature key with 50% "1" bits and 50% "0" bits. That is, logic levels of a half of the plurality of bits of the signature key are at a logic HIGH level, denoted "1", and logic levels of the other half of the plurality of bits of the signature key are at a logical LOW level opposite to the logical HIGH level. For example, a 20-bit signature key of "11111111110000000000" would be preferable to a 20-bit signature key of "11111111111111000000." Moreover, since the signature key includes information of the addresses of the portion of the plurality of PUF cells 102, it is preferred to construct the address with 50% "1" bits and 50% "0" bits. Logic levels of a half of the plurality of bits of the address are at a logic HIGH level, and logic levels of the other half of the plurality of bits of the address are at a logical LOW level. Consequently, combination of the address can be expressed by $C_{1/2}^{1}$, wherein 1 represents a quantity of bits of the address.

In an example in which the address is represented by 10 bits, a combination of the address is $C_{5}^{10}$. There are 252 possible combinations for a 10-bit address. In the following discussion, it is assumed that every address is required, and therefore there are 252 PUF cells, for example, the PUF cell 102-0 to the PUF cell 102-251. The exemplary lookup table 140 is shown in Table 1 below. For brevity, the exemplary lookup table 140 below only shows addresses and state changing information of the PUF cells from 102-0 to 102-5.

TABLE 1

| PUF | STATE CHANGING INFORMATION | ADDRESS |
|---|---|---|
| PUF cell 102-0 | 1000000000000000 . . . 00 | 1010101010 |
| PUF cell 102-1 | 0100000000000000 . . . 00 | 1100110010 |
| PUF cell 102-2 | 0010000000000000 . . . 00 | 0101010101 |
| PUF cell 102-3 | 0001000000000000 . . . 00 | 1110001010 |
| PUF cell 102-4 | 0000100000000000 . . . 00 | 0001110101 |
| PUF cell 102-5 | 0000010000000000 . . . 00 | 0000011111 |

Observed from Table 1, when a state of the PUF cell 102-0 is changed, the state determination device 120 obtains the state changing information of 1000000000000000 . . . 00 and converts the state changing information of 1000000000000000 . . . 00 into the address of 1010101010. Subsequently, the state determination device 120 provides the address of 1010101010 to the register 160.

The register 160 functions to receive the addresses of the changed PUF cells from the lookup table 140, collect the addresses of the changed PUF cells by using a plurality of registers thereof and generating the signature key at least based on the order. In the present embodiment, the register 160 is depicted as a single element; however, the present disclosure is not limited thereto. In some embodiments, the register 160 includes the plurality of registers.

The controller 180 functions to set a state of each of the plurality of PUF cells 102 to a uniform level, when the controller 180 receives an instruction from any source to generate the signature key. For example, the controller 180 sets the state of each of the plurality of PUF cells 102 to a logic HIGH level. Moreover, the controller 180 functions to control the register 160, such that the register 160 does not generate the signature key until a quantity of the changed PUF cells reaches a predetermined quantity.

In addition, the controller 180 functions to determine the predetermined quantity according to a desired bit length of the signature key retrieved from, for example, non-volatile memory. That is, the desired bit length of the signature key is a factor that determines the predetermined quantity. It should be noted that, for security purposes, a desired bit length of a signature key should not be too short. If the desired bit length is too short, the signature key is too easily cracked. A design of the system 10 would take the desired bit length of the signature key into consideration.

Combination of the signature key can be expressed by $C_{k/2}^{k}$, wherein k represents a desired bit length of the signature key. For example, when the signature key is a 10-bit signature key, k would be ten. As noted above, the register 160 generates the signature key based on the order of flip of the PUF cells 102. When the PUF cell 102-0 is a first changed PUF cell and the PUF cell 102-2 is a second changed PUF cell, information stored by the register 160 would be 10101010100101010101 . . . . In contrast, when the PUF cell 102-2 is a first changed PUF cell and the PUF cell 102-0 is a second changed PUF cell, information stored by the register 160 would be 01010101011010101010 . . . . The information is one of the possible permutations of the changed PUF cell. The approach of the present disclosure is related to permutation. Therefore, to satisfy the combination of the signature key, the number of possible permutations of the changed PUF cell should be equal to or greater than the number of possible combinations of the signature key. A relationship between permutation of the changed PUF cells and combination of the signature key can be expressed in equation (1) below.

$$P_n^m \geq C_{\frac{k}{2}}^k \quad (1)$$

Where $P_n^m$ represents the number of possible permutations of the changed PUF cell, m represents the quantity of the PUF cells 102, and n represents the predetermined quantity (i.e., the quantity of the portion of the plurality of PUF cells 102 required). The controller 180 determines the predetermined quantity according to a relationship between the number of possible permutations of the changed PUF cells and the number of possible combinations of the signature key. Since the quantity of the PUF cells 102 is known and the desired bit length of the signature key is known, according to equation (1) above, the quantity of changed PUF cells required can be found.

Moreover, m should not be less than k. Otherwise, some information would be lost and an adverse effect would be incurred. In an embodiment where m is equal to k, n is less than k (the predetermined quantity is less than the desired bit length). That is, the desired bit length of the signature key is greater than the number of the plurality of state changing information. Therefore, in such embodiment, it is not necessary to wait for all of the PUF cells 102 to flip, i.e., it is only required to wait for n of m PUF cells 102 to flip. The signature key is generated based on the order of change in the state of at least a portion of the plurality of PUF cells 102s.

In some existing power-up approaches, for a k-bit signature key, it is necessary to wait until all of the k PUF cells (for example, SRAM cells) become stable, and to use a state of the stable k PUF cells to generate the k-bit signature key. For example, for a 128-bit signature key, it is required to wait until all of the 252 PUF cells become stable. Since k is greater than n, such procedure is relatively time inefficient.

The encoder 170, for example, in response to the control of the controller 180, functions to provide the signature key by scrambling the information stored by the register 160, such that the design of the lookup table 140 is very difficult to predict using reverse engineering on the signature key. In some embodiments, the controller 180 is able to determine whether the encoder 170 receives the information from the register 160, and controls the encoder 170 to generate the signature key when the controller 180 determines that the encoder 170 has received the signature key. In some embodiments, the encoder 170 includes a linear feedback shift register. In some embodiments, the encoder 170 functions to generate the signature key by compressing the information when a length of the information is longer than the desired bit length. For example, the information has 160 bits, while the desired bit length is 128 bits.

For better understanding of the concept of the present disclosure, the following example is presented, in which it is assumed that a desired bit length of the signature key is 128 bits, and a length of the address of the PUF cell 102 is 10 bits. In operation, the controller 180 sets a state of all of the PUF cells 120 to a logic HIGH level. After a period of time has elapsed, a rate of changing the state for each PUF cells 102 varies because of inherent variations in an IC device. The state determination device 120 samples all of the PUF cells 102 continually. When the change is determined, the lookup table 140 provides the corresponding address to the register 160. For the 10-bit address, there are 252 addresses ($C_5^{10}$). In the present example, every address is required. That is, m is 252. According to equation (1), when the quantity of the changed PUF cells (the portion of the plurality of PUF cells 102) is sixteen, the equation (1) is just satisfied. The value of sixteen represents the minimum quantity for satisfying equation (1). After the sixteen PUF cells 102 are changed, the signature key is obtained. Such procedure is relatively time efficient.

In some existing power-up approaches, for a 128-bit signature key, it is necessary to wait until all 128 of the PUF cells (for example, SRAM cells) become stable, and to use the states of the all 128 of the stable PUF cells to generate the 128-bit signature key. Since the value of 128 is much greater than the value of 16, such existing approaches are relatively time inefficient.

Moreover, since the address is represented by 10 bits, 160 bits are required to express addresses of the sixteen PUF cells 102. A bit length of 160 bits to express the information including the addresses of the sixteen PUF cells 102 is greater than the desired bit length of 128 bits of the signature key. Therefore, in addition to scrambling the information provided by the register 160, the encoder 170 also compresses the 160-bit information to a 128-bit signature key.

In some embodiments, as noted above, before a first PUF cell is changed, the state determination device 120 performs the sampling operation on each of the PUF cells 102. As mentioned above, the PUF cell 102-0 is a first changed PUF cell. Before the PUF cell 102-0 flips, the sampling operation is performed. Therefore, once the PUF cell 102-0 flips, the flip of the PUF cell 102-0 can be recognized. Accordingly, the address of the PUF cell 102-0 is at the beginning of the information stored by the register 160. If the sampling operation is performed after the PUF cell 102-0 flips, since the first changed PUF cell is missed, it is required to wait for a total of seventeen PUF cells to flip. As a result, before the first PUF cell is changed, the state of each PUF cell 102 is sampled, increasing the efficiency in generating the signature key.

In some embodiments, a quantity of bits of the address is associated with a quantity of the PUF cells 102. In further detail, if every address is required, then since each address corresponds to one PUF cell 102, the quantity of the PUF cell 102 can also be represented by $C_{1/2}^l$. Such quantity is the maximum quantity of the PUF cells 102. Alternatively, if not every address is required, then the quantity of the PUF cells 102 is less than $C_{1/2}^l$. For example, the address with continually repeated bits, such as 0000011111, is not preferred since the signature key including such address is relatively easy to be cracked. Therefore, such address may not be required.

When the address has 10 bits, then there are 252 PUF cells. In some embodiments, area cost is a consideration. Therefore, it is desired to implement the present disclosure with fewer PUF cells 102. For example, it is desired to decrease the quantity of PUF cells from 252 to 128. According to the above equation (1), the minimum quantity for satisfying equation (1) is 18. After 18 PUF cells 102 are changed, the signature key is obtained. Such approach is relatively time efficient compared to the existing approaches. Moreover, such approach is also relatively area cost efficient.

Figure 2:
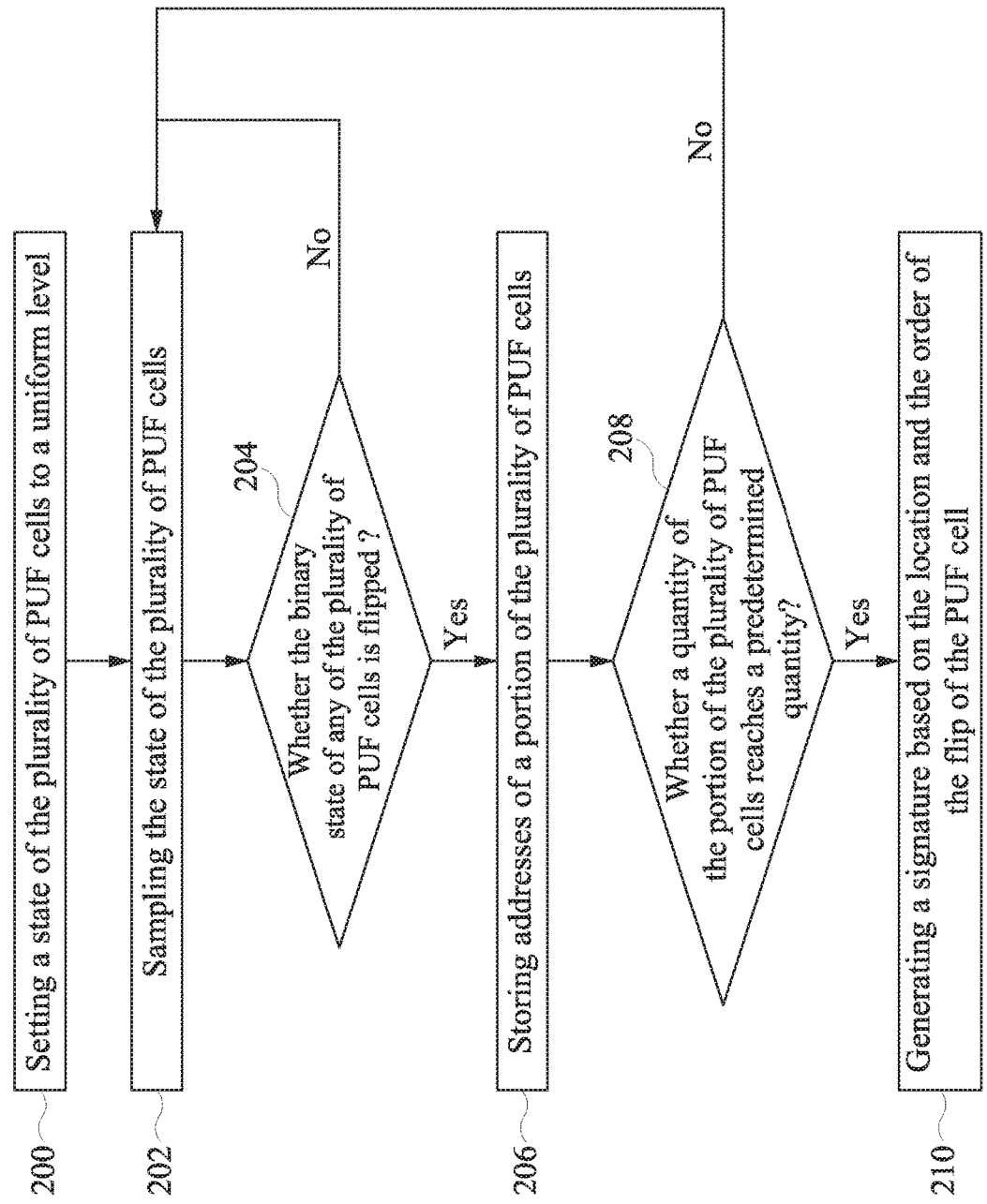
FIG. 2 is a flowchart of a method of for utilizing a plurality of physical unclonable function (PUF) cells to generate a signature key with a desired bit length, in accordance with some embodiments.

FIG. 2 is a flowchart of a method 20 of for utilizing a plurality of physical unclonable function (PUF) cells to generate a signature key with a desired bit length, in accordance with some embodiments. Referring to FIG. 2, the method 20 includes operations 200, 202, 204, 206, 208 and 210.

In operation 200, a state of the plurality of PUF cells is set to a uniform level, for example, a logic HIGH level.

In operation 202, the state of the plurality of PUF cells is sampled.

In operation 204, it is determined whether the state of any of the plurality of PUF cells is changed. If negative, the method 20 returns to operation 202. If affirmative, the method 20 proceeds to operation 206. In operation 206, addresses of a portion of the plurality of PUF cells, wherein the state of the portion of the plurality of PUF cells is changed.

Subsequent to operation 206, in operation 208, it is determined whether a quantity of the portion of the plurality of PUF cells reaches a predetermined quantity. If negative, the method 20 returns to operation 202. If affirmative, the method 20 proceeds to operation 210. In operation 210, a signature key is generated based on the addresses of the portion of the plurality of PUF cells and the order of change in the state of the portion of the plurality of PUF cells.

The method 20 is merely an example, and is not intended to limit the present disclosure beyond what is explicitly recited in the claims. Additional operations can be provided before, during, and after the method 20, and some operations described can be replaced, eliminated, or moved around for additional embodiments of the method.

In the present disclosure, it is not necessary to wait for all of the PUF cells to flip. The signature key is generated based on the order of flip of the state of a portion of the PUF cells. Such approach is relatively time efficient.

Figure 3:
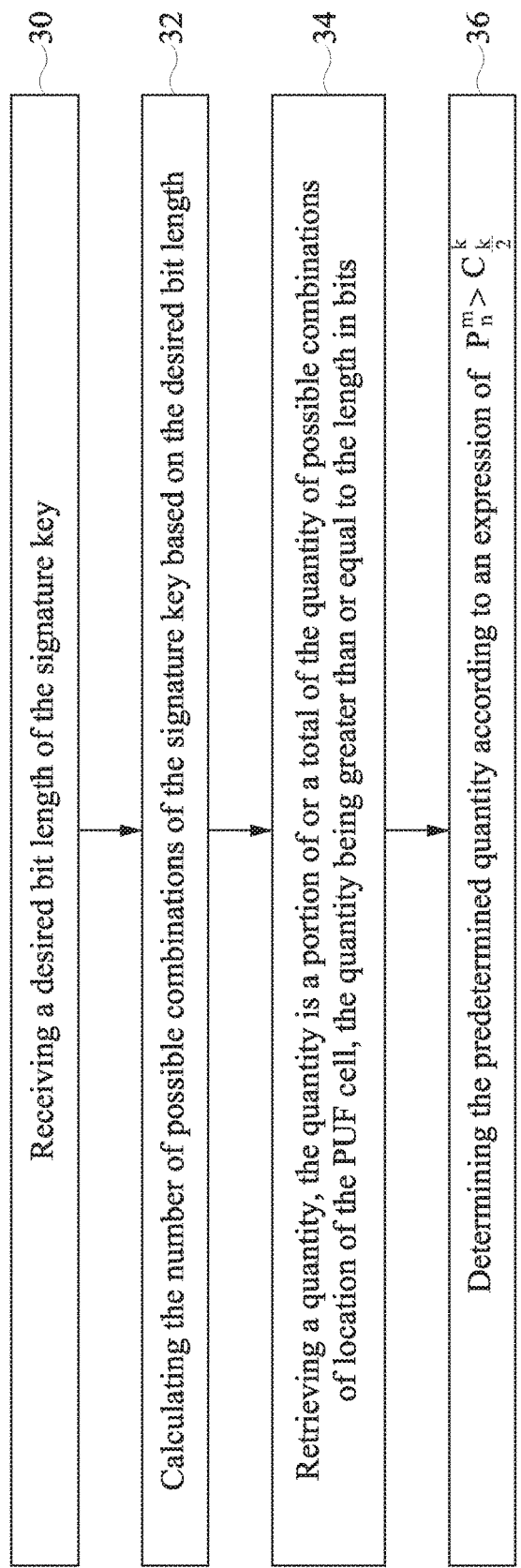
FIG. 3 is a flowchart of the operation shown in FIG. 2, in accordance with some embodiments.

FIG. 3 is a flowchart of operation 208 shown in FIG. 2, in accordance with some embodiments. Referring to FIG. 3, operation 208 includes operations 30, 32, 34 and 36.

In operation 30, a desired bit length of the signature key is received.

In operation 32, the number of possible combinations of the signature key is calculated based on the desired bit length. Combination of the signature key can be represented by $C_{k/2}^k$, wherein k represents the desired bit length of the signature key.

In operation 34, a quantity is retrieved. The quantity is a portion of or a total of the quantity of possible combinations of the address of the PUF cell. The quantity is greater than or equal to the desired bit length. The quantity of possible combinations of the address can be expressed by $C_{1/2}^1$, wherein l represents the quantity of bits of the address.

In operation 36, the predetermined quantity is determined according to the equation (1).

Operation 208 is merely an example, and is not intended to limit the present disclosure beyond what is explicitly recited in the claims. Additional operations can be provided before, during, and after operation 208, and some operations described can be replaced, eliminated, or moved around for additional embodiments of the method.

Figure 4:
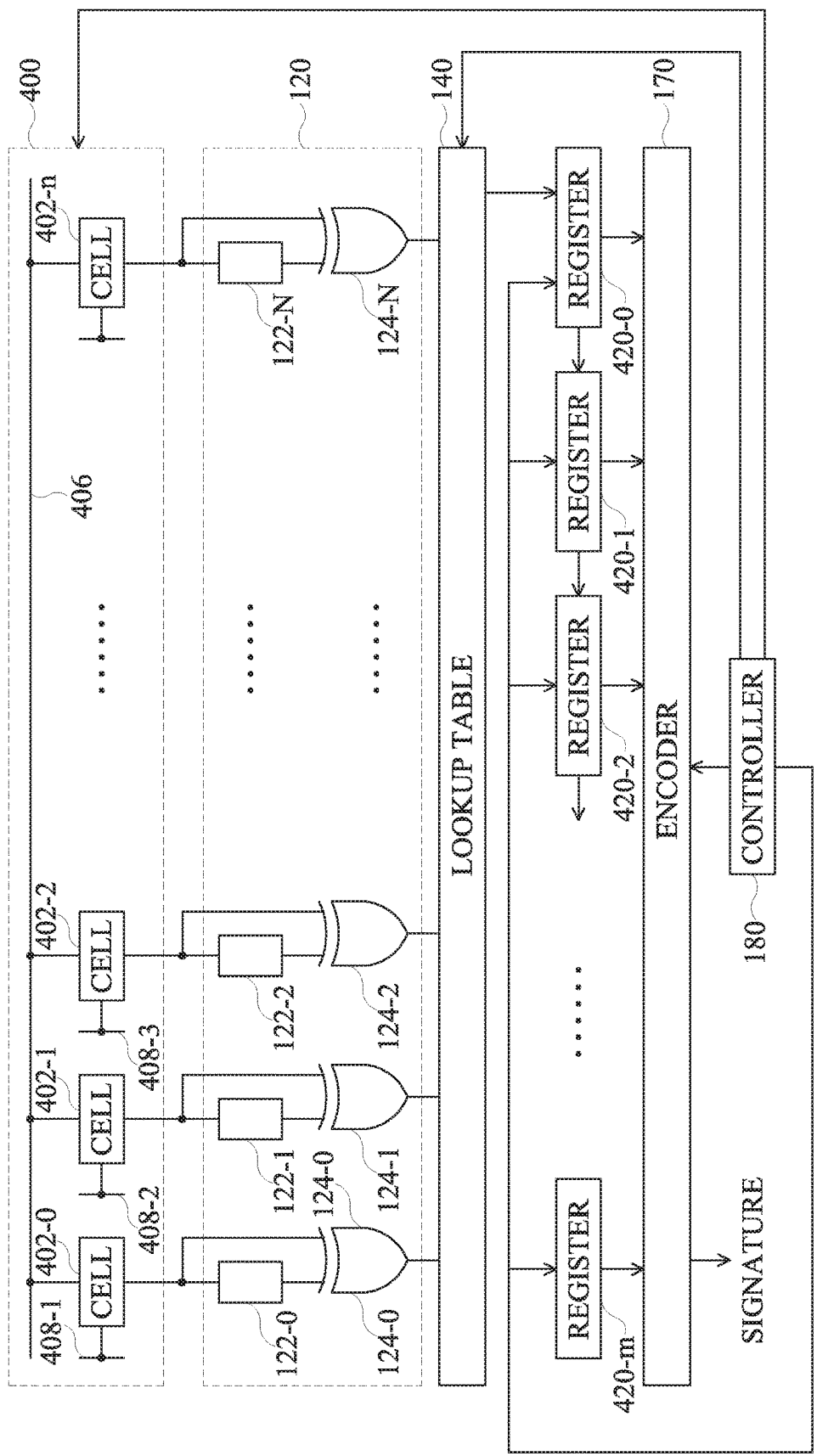
FIG. 4 is a schematic diagram of a system for generating a signature key, in accordance with some embodiments.

FIG. 4 is a schematic diagram of a system 40 for generating a signature key, in accordance with some embodiments. Referring to FIG. 4, the system 40 is similar to the system 10 described and illustrated with reference to FIG. 1 except that, for example, the system 40 includes a memory array 400, a state determination device 120 including a plurality of registers 122 (for example, 122-0, 122-1, 122-2 . . . 122-N) and a plurality of exclusive or (XOR) logic gates (for example, 124-0, 124-1, 124-2 . . . 124-n, wherein n is positive integer), a lookup table 140, and a plurality of registers 420 (for example, 420-0, 420-1, 420-2 . . . 420-m, wherein m is positive integer).

The memory array 400 includes a plurality of memory cells 402 (for example, 402-0, 402-1, 402-2 . . . 402-N). The memory cells 402 are controlled, in the present embodiment, by the same word line 406. However, the present disclosure is not limited thereto. The memory cells 402 may be controlled by different word lines 406. Moreover, the memory cells 402 are respectively accessed by one bit line 408. Operation of the system 40 will be described in detail with reference to FIGS. 6 to 7.

Figure 5:
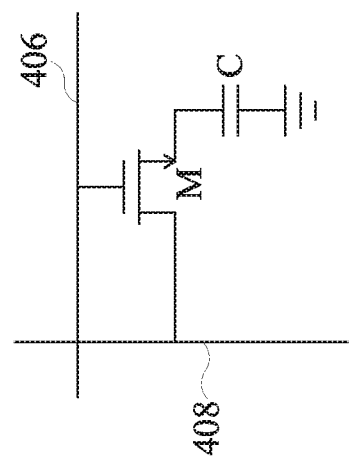
FIG. 5 is a circuit diagram of the memory cell shown in FIG. 4, in accordance with some embodiments.

FIG. 5 is a circuit diagram of the memory cell 402 shown in FIG. 4, in accordance with some embodiments. Referring to FIG. 5, the memory cell 402 is a DRAM cell including a transistor M and a capacitor C. When the controller 180 sets a state of the memory cell 402 to a logic HIGH level, the word line 406 is provided with a supply voltage. As such, the transistor M is conducted. The bit line 408 writes the logic HIGH level to the capacitor C.

Figure 6:
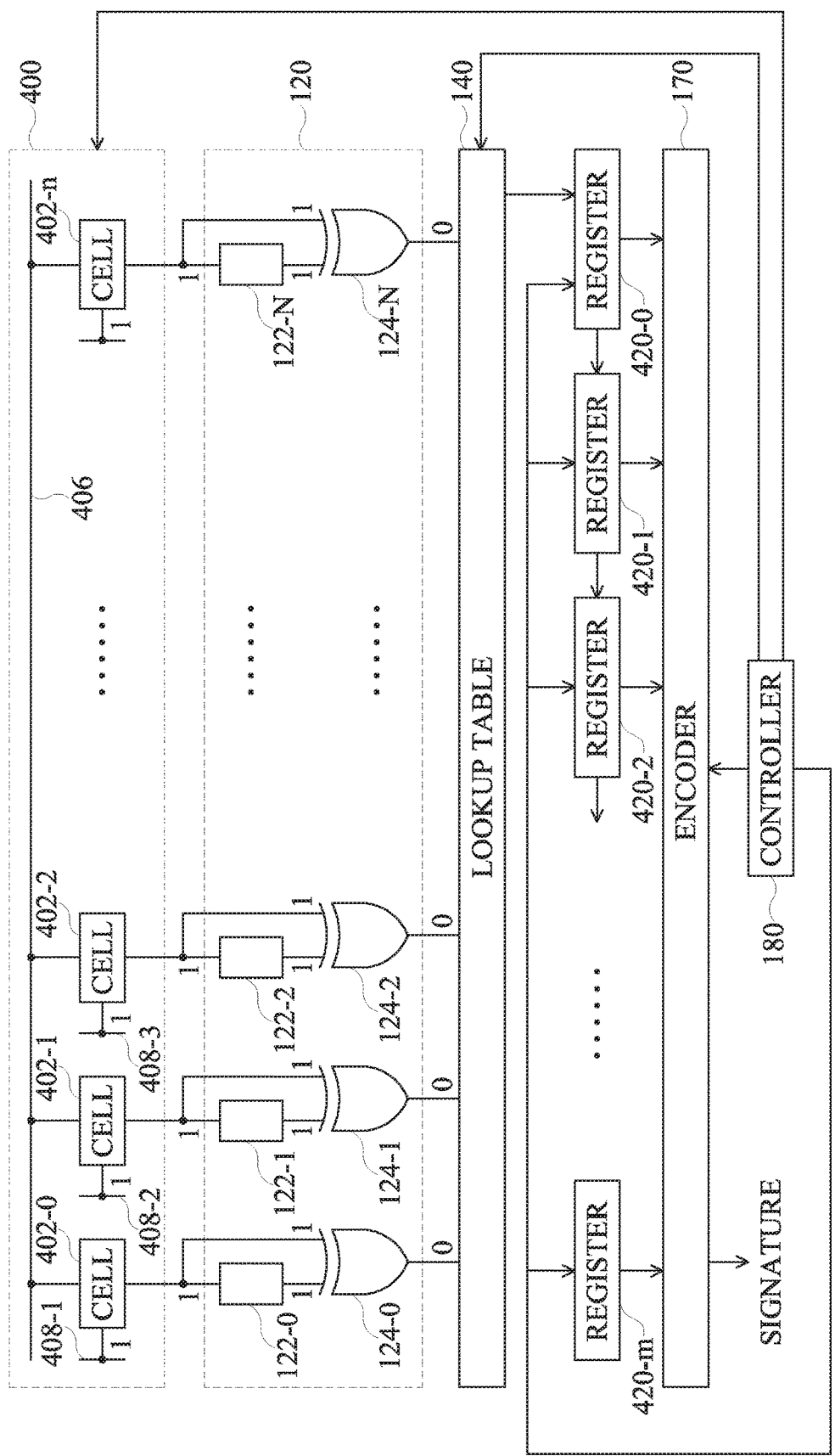
FIGS. 6 to 8 are schematic diagrams illustrating one of various operations of operating the system shown in FIG. 4, in accordance with some embodiments.
Figure 7:
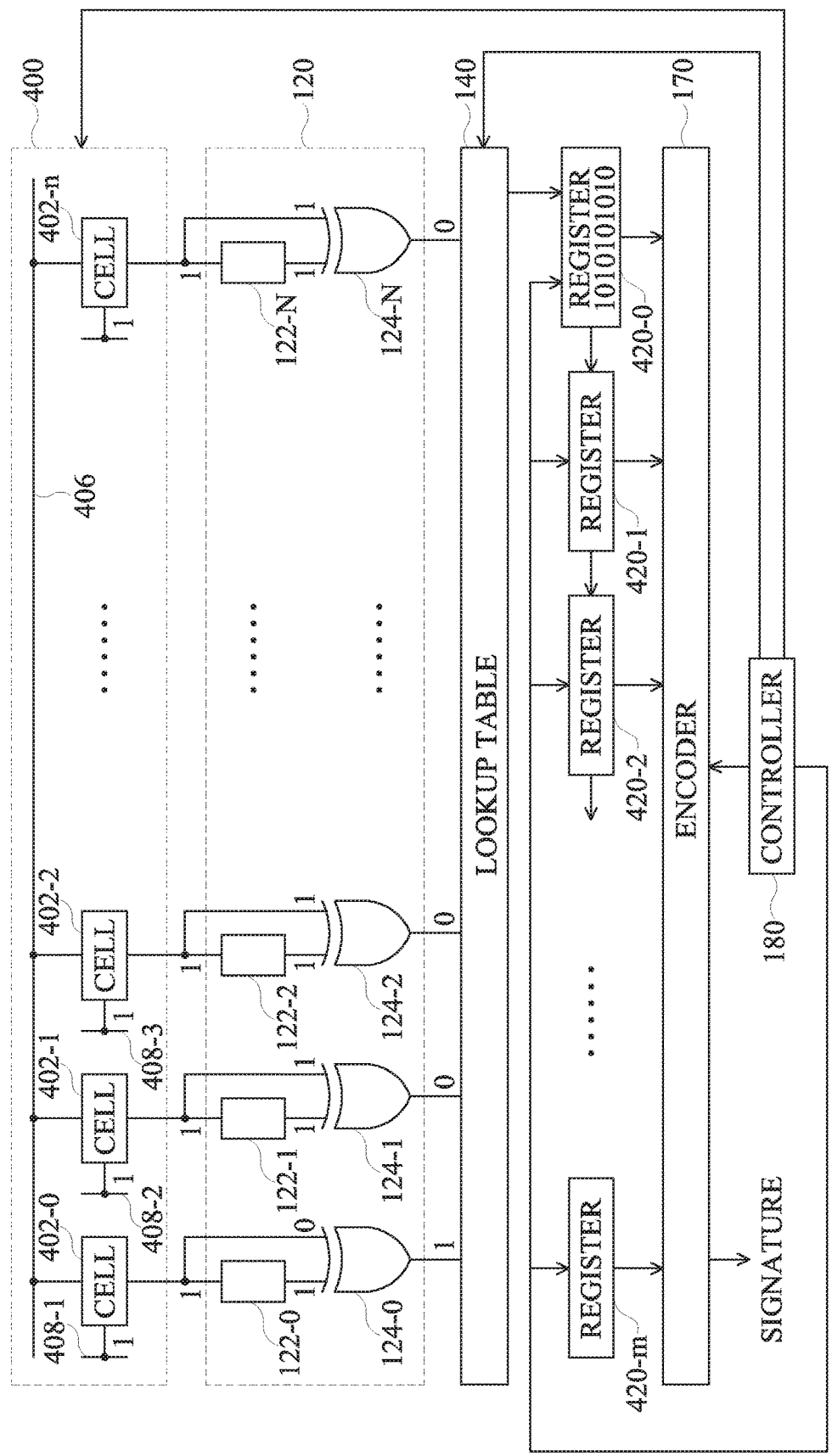
Figure 8:
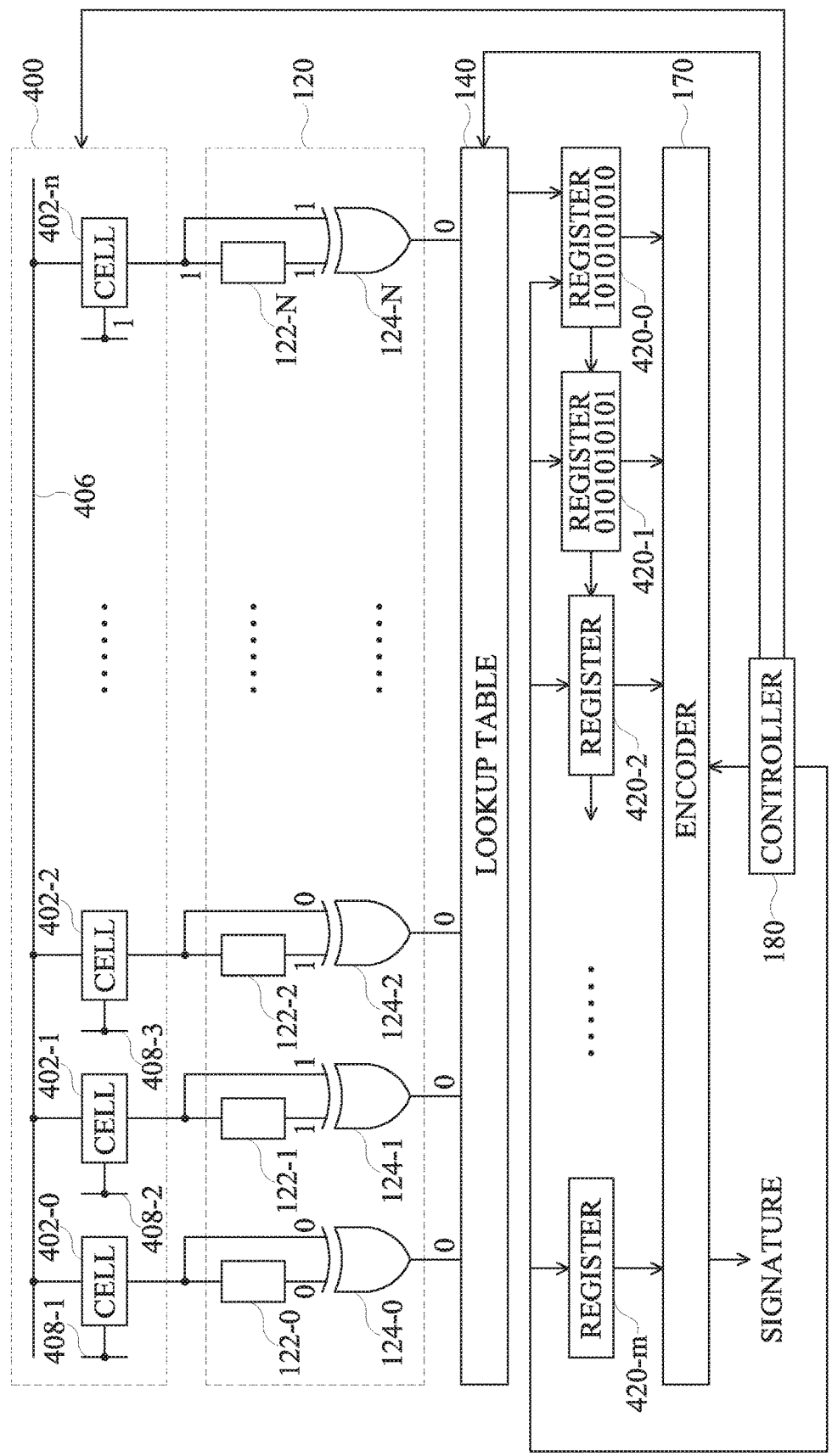

FIGS. 6 to 8 are schematic diagrams illustrating various operations of operating the system 40 shown in FIG. 4, in accordance with some embodiments. Referring to FIG. 6, the controller 180 functions to set a state of the plurality of the PUF cells 402 to a logic HIGH level when the controller 180 receives an instruction to generate the signature key. The memory cells 402 provide a logic HIGH level, denoted "1" to the associated registers 122. Referring to FIG. 7, a state of only the memory cell 402-0 is changed from a logic HIGH level to a logic LOW level, denoted "0." A logic LOW level is provided to the XOR logic gate 124-0. The XOR logic gate 124-0 receives "1" from the register 122 and "0" from the memory cell 402-0, and accordingly provides "1" to the lookup table 140. Moreover, for example, the register 122-0 would be changed to store the updated logic LOW level. The lookup table 140 converts the state change information of 1000000000000000 . . . 00 into the address (1010101010) of the memory cell 402-0 (same as the address of the PUF cell 102-0, for convenience), and then provide such address to the register 420-0. Referring to FIG. 8, a state of only the memory cell 402-2 is changed, and the change is sampled. Following the same process as that described with reference to FIG. 7, the lookup table 140 converts the stage change information of 0010000000000000 . . . 00 to the address (0101010101) of the memory cell 402-2 (same as the address of the PUF cell 102-2, for convenience), and then provides such address to the register 420-0. Moreover, the register 420-0 shifts the address (1010101010) of the memory cell 402-0 to the register 420-1. The process is repeated until all of the registers 420 have stored the address. A quantity of the register 420 is equal to the predetermined quantity mentioned above. After all of the registers 420 have stored the address, the registers 420 provide the information to the encoder 170. The encoder 170 generates the signature key by scrambling and compressing the information.

In the present disclosure, it is not necessary to wait for all of the PUF cells 402 to flip. The signature key is generated based on the order of flip of the state of a portion of the PUF cells 402. Such procedure is relatively time efficient.

Some embodiments have one or a combination of the following features and/or advantages. In some embodiments, a method for utilizing a plurality of physical unclonable function (PUF) cells to generate a signature key with a desired bit length is provided. The method includes setting a state of each of the plurality of PUF cells to a uniform level; obtaining an order of change in the state of at least a portion of the plurality of PUF cells; and generating the signature key at least based on the order.

In some embodiments, a method for utilizing a plurality of physical unclonable function (PUF) cells to generate a signature key with a desired bit length is provided. The method includes setting a state of each of the plurality of PUF cells to a uniform level; sampling the state of a portion of the plurality of PUF cells to obtain a plurality of state changing information, the plurality of state changing information corresponding to the portion of the plurality of PUF cells, wherein the number of the plurality of state changing information is less than the number of the plurality of PUF cells; and generating the signature key based on the plurality of state changing information, wherein the desired bit length of the signature key is greater than the number of the plurality of state changing information.

In some embodiments, a system to generate a signature key. The system includes a plurality of physical unclonable function (PUF) cells, a controller, a state determination device and an encoder. The controller is arranged for setting a state of each of the plurality of PUF cells to a uniform level. The state determination device is arranged for obtaining an order of change in the state of at least a portion of the plurality of PUF cells. The encoder is arranged for generating a signature key at least based on the order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for utilizing a plurality of physical unclonable function (PUF) cells to generate a signature key with a desired bit length, the method comprising:
setting a state of each of the plurality of PUF cells to a uniform level at a predetermined time point, wherein each of the plurality of PUF cells has retention time, wherein the retention time of each PUF cell is between the predetermined time point and a time point when a state of each of the plurality of PUF cells changes, and the retention times of the plurality of PUF cells are all different from each other;
periodically sampling states of the plurality of PUF cells until states of at least a portion of the plurality of PUF cells change, and states of the other PUF cells are unchanged to obtain an order of change in the state of at least the portion of the plurality of PUF cells, including:
at a first time, determining only a state of a PUF cell of the plurality of PUF cells is changed, and states of the other PUF cells of the plurality of PUF cells is unchanged, and generating a first state changing information according to position of the first changed PUF cell among the plurality of PUF cells;
generating a first address according to the first state changing information accordingly;
at a second time after the first time, determining only a state of another PUF cell of the plurality of PUF cells is changed except the first changed PUF cell, and states of the other PUF cells of the plurality of PUF cells is unchanged, and generating a second state changing information according to position of the second changed PUF cell among the plurality of PUF cells; and
generating a second address according to the second state changing information accordingly; and
generating the signature key at least based on the first address and the second address.

2. The method as claimed in claim 1, wherein the obtaining the order of change in the state of at least the portion of the plurality of PUF cells comprises:
determining the number of the portion of the plurality of PUF cells according to the desired bit length.

3. The method as claimed in claim 2, wherein the signature key includes information of addresses of the portion of the plurality of PUF cells.

4. The method as claimed in claim 3, wherein the generation of the signature key comprises:
collecting the addresses of the portion of the plurality of PUF cells by using a plurality of registers.

5. The method as claimed in claim 2, wherein the number of the portion of the plurality of PUF cells is less than the desired bit length.

6. The method as claimed in claim 1, wherein the periodically sampling states of the plurality of PUF cells comprises:
periodically sampling states of the plurality of PUF cells by using a sampling rate, wherein a sampling period corresponding to the sampling rate is shorter than a minimum time difference between two consecutive changes of the state of two of the plurality of PUF cells.

7. The method as claimed in claim 6, wherein the plurality of state changing information individually corresponds to one of the portion of the plurality of PUF cells.

8. The method as claimed in claim 7, further comprising:
generating a lookup table; and
individually converting the plurality of state changing information into one of a plurality of addresses based on the lookup table.

9. The method as claimed in claim 8, wherein each of the plurality of addresses includes a plurality of bits, and logic levels of a half of the plurality of bits are at a high logical level, and logic levels of the other half of the plurality of bits are at a low logical level opposite to the high logical level.

10. A method for utilizing a plurality of physical unclonable function (PUF) cells to generate a signature key with a desired bit length, the method comprising:
setting a state of each of the plurality of PUF cells to a uniform level at a predetermined time point, wherein each of the plurality of PUF cells has retention time, wherein the retention time of each PUF cell is between the predetermined time point and a time point when a state of each of the plurality of PUF cells changes, and the retention times of the plurality of PUF cells are all different from each other;
periodically sampling states of the plurality of PUF cells until states of a portion of the plurality of PUF cells change, and states of the other PUF cells are unchanged to obtain a plurality of state changing information, the plurality of state changing information corresponding to the portion of the plurality of PUF cells, wherein the number of the plurality of state changing information is less than the number of the plurality of PUF cells; and generating the signature key based on the plurality of state changing information, wherein the desired bit length of the signature key is greater than the number of the plurality of state changing information.

11. The method as claimed in claim 10, wherein relationship between the portion of the plurality of PUF cells and the plurality of PUF cells is expressed by $P_n^m$, wherein n represents the number of the portion of the plurality of PUF cells, and m represents the number of the plurality of PUF cells.

12. The method as claimed in claim 11, wherein the number of the plurality of PUF cells is greater than the desired bit length.

13. The method as claimed in claim 12, further comprising:

determining the number of the portion of the plurality of PUF cells according to a relationship between $P_n^m$ and $C_{k/2}^k$, wherein k represents the desired bit length.

14. The method as claimed in claim 13, wherein the relationship between the $P_n^m$ and the $C_{k/2}^k$ is expressed as follows:

$$P_n^m > C_{k/2}^k.$$

15. A system to generate a signature key, comprising:
a plurality of physical unclonable function (PUF) cells;
a controller, arranged for setting a state of each of the plurality of PUF cells to a uniform level at a predetermined time point, wherein each of the plurality of PUF cells has retention time, wherein the retention time of each PUF cell is between the predetermined time point and a time point when a state of each of the plurality of PUF cells changes, and the retention times of the plurality of PUF cells are all different from each other;
a state determination device, arranged for periodically sampling states of the plurality of PUF cells until states of at least a portion of the plurality of PUF cells change, and states of the other PUF cells are unchanged to obtain an order of change in the state of at least the portion of the plurality of PUF cells; and
an encoder arranged for generating a signature key at least based on the order.

16. The system as claimed in claim 15, further comprising:
a plurality of registers, arranged for sampling the state of a portion of the plurality of PUF cells to obtain a plurality of state changing information, the plurality of state changing information corresponding to the portion of the plurality of PUF cells.

17. The system as claimed in claim 16, wherein the plurality of state changing information individually corresponds to one of the portion of the plurality of PUF cells respectively.

18. The system as claimed in claim 16, further comprising:
a lookup table, arranged for converting the plurality of state changing information into a plurality of addresses respectively based on the lookup table.

19. The system as claimed in claim 15, wherein the controller is further configured to determining the number of the portion of the plurality of PUF cells according to a desired bit length of the signature key.

20. The method as claimed in claim 19, wherein the signature key includes information of addresses of the portion of the plurality of PUF cells.

* * * * *